United States Patent
Wang et al.

(10) Patent No.: US 10,467,393 B2
(45) Date of Patent: Nov. 5, 2019

(54) METHOD AND DEVICE FOR TRIGGERING APPLICATION

(71) Applicant: Beijing Xiaomi Mobile Software Co., Ltd., Haidian Street, Beijing (CN)

(72) Inventors: Le Wang, Beijing (CN); Minghao Li, Beijing (CN); Yanfei Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 285 days.

(21) Appl. No.: 15/612,144

(22) Filed: Jun. 2, 2017

(65) Prior Publication Data

US 2017/0357789 A1   Dec. 14, 2017

(30) Foreign Application Priority Data

Jun. 8, 2016   (CN) .......................... 2016 1 0404024

(51) Int. Cl.
*G06F 21/31*   (2013.01)
*H04W 12/08*   (2009.01)
(Continued)

(52) U.S. Cl.
CPC .......... *G06F 21/31* (2013.01); *G06F 3/04817* (2013.01); *G06F 9/543* (2013.01);
(Continued)

(58) Field of Classification Search
None
See application file for complete search history.

(56) References Cited

U.S. PATENT DOCUMENTS 8,458,775 B2 * 6/2013 Lester .................... G06F 21/31
                                                 713/152
9,253,170 B2   2/2016 Linga et al.
(Continued)

FOREIGN PATENT DOCUMENTS

CN      103400067 A    11/2013
CN      103778363 A     5/2014
(Continued)

OTHER PUBLICATIONS

Xudong Ni et al., "DiffUser: Differentiated User Access Control on Smartphones," 2009 IEEE 6th International Conference on Mobile Adhoc and Sensor Systems, Jan. 1, 2009, pp. 1012-1017, XP055282746, DOI: 10.1109/MOBHOC.2009.5337017 ISBN: 978-1-4244-5114-2.

(Continued)

*Primary Examiner* — Christopher A Revak
(74) *Attorney, Agent, or Firm* — Arch & Lake LLP (57) ABSTRACT

An application triggering method and device are provided in the field of terminals. The terminal device sets at least two different triggering passwords for at least two instances of an application corresponding to an application icon on a user interface on the display. The terminal device acquires an input password after a triggering operation over the application icon is detected on the user interface. The terminal device triggers a target instance of the application according to the input password, where the target instance refers to an instance for which one of the at least two different triggering passwords is the same as the input password.

15 Claims, 5 Drawing Sheets

(51) Int. Cl.
  *G06F 21/62* (2013.01)
  *H04L 29/06* (2006.01)
  *G06F 3/0481* (2013.01)
  *G06F 9/54* (2006.01)

(52) U.S. Cl.
  CPC ........ *G06F 21/629* (2013.01); *G06F 21/6209* (2013.01); *H04L 63/102* (2013.01); *H04W 12/08* (2013.01); *G06F 2221/2149* (2013.01)

(56) References Cited

U.S. PATENT DOCUMENTS

| | | | | |
|---|---|---|---|---|
| 9,524,746 | B2* | 12/2016 | Nakano | G06F 21/10 |
| 9,654,332 | B1* | 5/2017 | Meoli | G06Q 40/08 |
| 9,781,089 | B2* | 10/2017 | Kaplan | H04L 63/08 |
| 2011/0321156 | A1* | 12/2011 | Smith | G06F 21/31 726/19 |
| 2013/0239192 | A1 | 9/2013 | Linga et al. | |
| 2015/0200921 | A1 | 7/2015 | Linga et al. | |
| 2015/0200930 | A1 | 7/2015 | Linga et al. | |
| 2017/0001116 | A1* | 1/2017 | Okamura | A63F 13/49 |

FOREIGN PATENT DOCUMENTS

| | | |
|---|---|---|
| CN | 103955638 A | 7/2014 |
| CN | 104008348 A | 8/2014 |
| CN | 104199734 A | 12/2014 |
| CN | 104243476 A | 12/2014 |
| CN | 104462976 A | 3/2015 |
| CN | 105224322 A | 1/2016 |
| CN | 105630318 A | 6/2016 |

OTHER PUBLICATIONS

Yunxin Liu et al., "Design, Realization, and Evaluation of xShare for Impromptu Sharing of Mobile Phones," IEEE Transactions on Mobile Computing, IEEE Service Center, Los Alamitos, CA, US, vol. 9, No. 12, Dec. 1, 2010, pp. 1682-1696, XP011317505, ISSN: 1536-1233.
International Search Report and Written Opinion issued in corresponding International Application No. PCT/CN2016/100860, dated Mar. 10, 2017, 8 pages.
Extended European search report issued in corresponding European Application No. 17174578.9, dated Aug. 8, 2017, 9 pages.
Chinese First Office Action (including English translation) issued in corresponding CN Application No. 201610404024.2, dated Jun. 8, 2018, 22 pages.
International Search Report (including English translation) issued in corresponding International Application No. PCT/CN2016/100860, dated May 9, 2017, 6 pages.

* cited by examiner

METHOD AND DEVICE FOR TRIGGERING APPLICATION

CROSS-REFERENCE TO RELATED APPLICATIONS

This application claims priority to Chinese Patent Application No. 201610404024.2, filed on Jun. 8, 2016, the entire contents of which are incorporated herein by reference.

TECHNICAL FIELD

The present disclosure generally relates to application triggering methods and devices on terminals, and more particularly, to application triggering methods corresponding to terminals having at least two instances of an application on a terminal.

BACKGROUND

Along with technical development for terminals, more and more applications may be installed on a terminal. The terminal may include one of: a smart phone, a tablet, a laptop, a smart watch, or other electronic device that can install an application. In order to protect personal privacy of a user, a terminal may provide a password protection function for the application installed on the terminal. Specifically, the terminal may set a unified triggering password for all installed applications, and the user may select to enable the password protection function for some applications. When the terminal detects triggering operation of the user over the password protection function for any application, the set triggering password is determined as a triggering password of the application. When the terminal detects the triggering operation over the application, it is verified whether a password input by the user is consistent with the triggering password or not, and the application is triggered if YES.

At present, in order to meet a requirement of logging of a user in the same application with multiple user accounts, a terminal may create another instance for the installed application. The created instance may be considered as a mirror of an original instance, and has all functions of the application. Each instance corresponds to an application icon. The abovementioned password protection function may also be adopted for the situation that an application corresponds to multiple instances, and the method is specifically as follows. When password protection is enabled for the application, the terminal may set a triggering password of to activate each instance of the application. When detecting triggering operation over an application icon of any instance of the application, the terminal prompts the user to input a password, verifies whether the input password is consistent with the triggering password or not. When the input password is consistent with the triggering password, the terminal triggers the instance corresponding to the application icon.

SUMMARY

According to a first aspect of the present disclosure, an application triggering method is provided. The method may be implemented by a terminal including a processor and a display. The terminal sets at least two different triggering passwords for at least two instances of an application corresponding to an application icon on a user interface on the display. The terminal acquires an input password after a triggering operation over the application icon is detected on the user interface. The terminal triggers a target instance of the application according to the input password, where the target instance refers to an instance for which one of the at least two different triggering passwords is the same as the input password.

According to a second aspect of the present disclosure, an application triggering device is provided. The application triggering device includes an acquisition module, which is configured to acquire an input password after a triggering operation over an application icon is detected. The application icon corresponds to at least two instances of an application. A triggering module is configured to trigger a target instance of the application according to the input password. At least two different triggering passwords are set for the at least two instances, respectively. The target instance refers to an instance for which one of the at least two different triggering passwords is the same as the input password.

According to a third aspect of the present disclosure, an application triggering device is provided. The application triggering device includes a processor and a memory configured to store instructions executable by the processor. The processor may be configured to acquire an input password after a triggering operation over an application icon is detected. The application icon corresponds to at least two instances of an application. The processor may also be configured to trigger a target instance of the application according to the input password. At least two different triggering passwords are set for the at least two instances, respectively. The target instance refers to an instance for which one of the at least two different triggering passwords is the same as the input password.

It should be understood that the foregoing general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

In order to make technical solutions and advantages of the present disclosure clear, the embodiments of the present disclosure will be further described in detail below with reference to the drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

When a mirror application is enabled, a user can have two copies of the same application to achieve the purpose of dual-open application. The operating system may provide the application of a lock function, in which the user must enter the appropriate password (characters, images or fingerprint password, etc.) to open the application. If it is a double open application, then two examples can set the password. However, the current dual-open application displays two icons of the same application when the user enables the mirror application, which is undesired by many users. This disclosure provides a new method and device for a user to have two or more instances of the same application without displaying multiple same icons on the device.

Figure 1A:
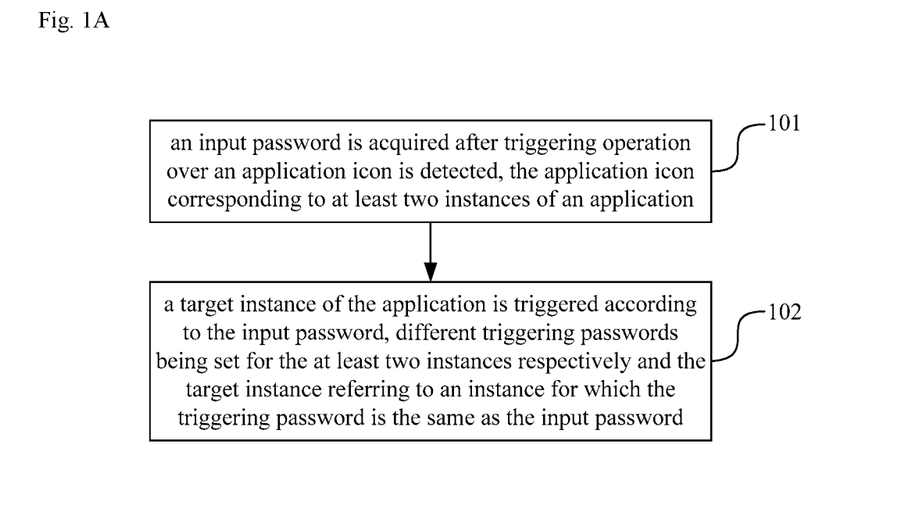
FIG. 1A is a flow chart showing an application triggering method, according to one or more exemplary embodiments.

FIG. 1A is a flow chart showing an application triggering method, according to one or more exemplary embodiments. The method may be implemented by a terminal and includes the following steps. The terminal may also be referred as terminal device. At Step 101, an input password is acquired after a triggering operation over an application icon is detected. The application icon corresponds to at least two instances of an application. At Step 102, a target instance of the application is triggered according to the input password. Different triggering passwords are set for the at least two instances, respectively, and the target instance refers to an instance for which the triggering password is the same as the input password.

Figure 1B:
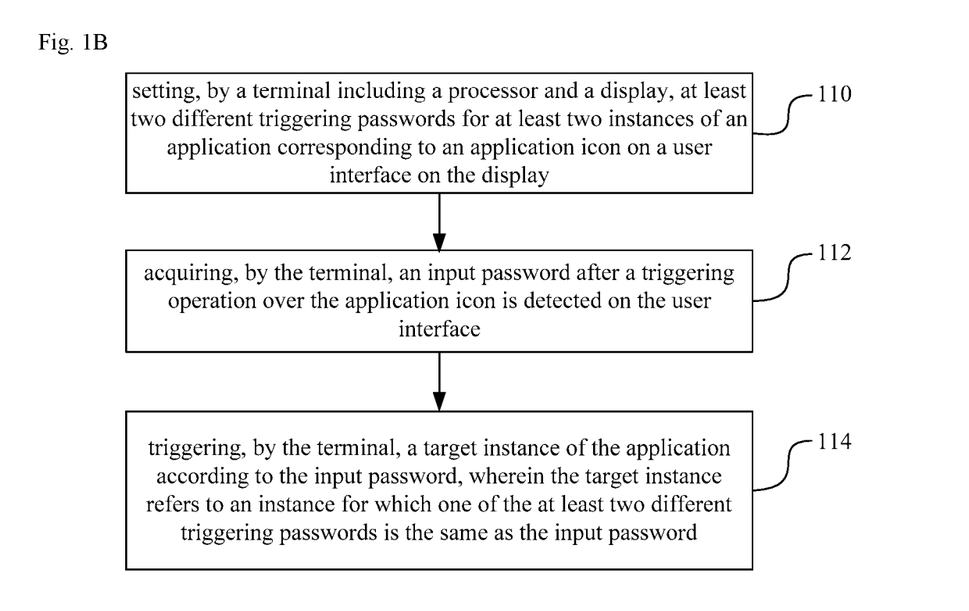
FIG. 1B is a flow chart showing an application triggering method, according to one or more exemplary embodiments.

FIG. 1B is a flow chart showing an application triggering method, according to one or more exemplary embodiments. The method may be implemented by a terminal including a processor and a display. At step 110, the terminal sets at least two different triggering passwords for at least two instances of an application corresponding to an application icon on a user interface on the display. For example, the terminal may set two different passwords for a social network application so that the user of the terminal may log on to different accounts in the social network application on the same smart phone. Further, the terminal may start multiple instances of the application at the same time so that the user may log in different instances with different user accounts at the same time on the smart phone. In another example, the terminal may set two passwords for a game application so that the user can play the game on the terminal using two different accounts.

At step 112, the terminal acquires an input password after a triggering operation over the application icon is detected on the user interface. The triggering operation may be a click operation. Attentively or additionally, the triggering operation may be a double click using two fingers, or other specific operation specified by the user, which is not limited in this disclosure. After detecting the triggering operation, the terminal may display a log-on user interface asking the user to input password.

At step 114, the terminal triggers a target instance of the application according to the input password, where the target instance refers to an instance for which one of the at least two different triggering passwords is the same as the input password. For example, the terminal may compare which saved password matches the input password and trigger the target instance according to the matched password.

In an example, a user has two accounts in the same social network such as Twitter, FaceBook, WeChat, etc. The user may use a public account for business purpose and a private account for private purpose. The user does not want his/her colleagues to know the private account in order to avoid embarrassment. The user may set a first graphics password for the public account while setting a second graphics password for the private account. On the user interface, the phone only displays one WeChat icon as an entrance. After the user clicks the icon, he may enter the first graphic password to log into the public account. While the public account is logged in, the user may enter the second graphic password to log in the private account simultaneously. Thus, the user can log in to two or more accounts using the same icon at the same time. The user may select which account to activate by inputting the corresponding activation password, where the activation password may be a graphic password. Further, after two or more accounts are logged in at the same time, the user only need to input the corresponding activation password to activate the corresponding account without displaying a user interface to select which account to activate. In some embodiments, the activation password may be combined with the screen-unlock password. Thus, when the user input a specific screen-unlock password, the corresponding social network account is activated.

During work time, the user may choose to enter the graphic password every time to use the public account. Even if colleagues peep next to see, it would be near impossible for the colleagues to know that the user also has a private account. The disclosed method thus effectively protects the user's privacy by retaining only one icon for the social network on the main user interface to avoid the appearances of multiple icons.

According to the method provided above, multiple instances corresponding to an application icon are distinguished by different triggering passwords. That allows different instances corresponding to the application icon to be triggered by different passwords in a multi-instance scenario when required. Thereby the privacy of a user is protected by adopting different passwords for different instances.

Optionally, the step that the target instance of the application is triggered according to the input password may include the following. The input password is compared with the set triggering passwords to determine the target instance of the application. The target instance of the application is then triggered.

Optionally, before the triggering operation for the application icon is detected, the method further includes the following. At least one instance is created according to an original instance of the application when a multi-instance creation operation for the application is detected. An instance identifier of the original instance and an instance identifier of the at least one instance are associated with the application icon, and a password protection function is enabled for the application.

Optionally, the step that the password protection function is enabled for the application includes that triggering passwords set by each account in at least two account system on the terminal are acquired. The step also includes the triggering passwords set by each account are determined as the triggering passwords for the at least two instances.

Optionally, the method further includes that the at least two application icons are generated according to the application icon when a separate display operation for the application icon is detected. The at least two application icons correspond to the at least two instances, respectively, and the at least two application icons are displayed.

Optionally, the method further includes that the at least two application icons are generated according to the application icon when a disabling operation over the password protection function for the application is detected. The at least two application icons correspond to the at least two instances respectively, and the at least two application icons are displayed.

All of the abovementioned optional technical solutions may be freely combined to form optional embodiments of the present disclosure, which will not be elaborated herein one by one.

Figure 2:
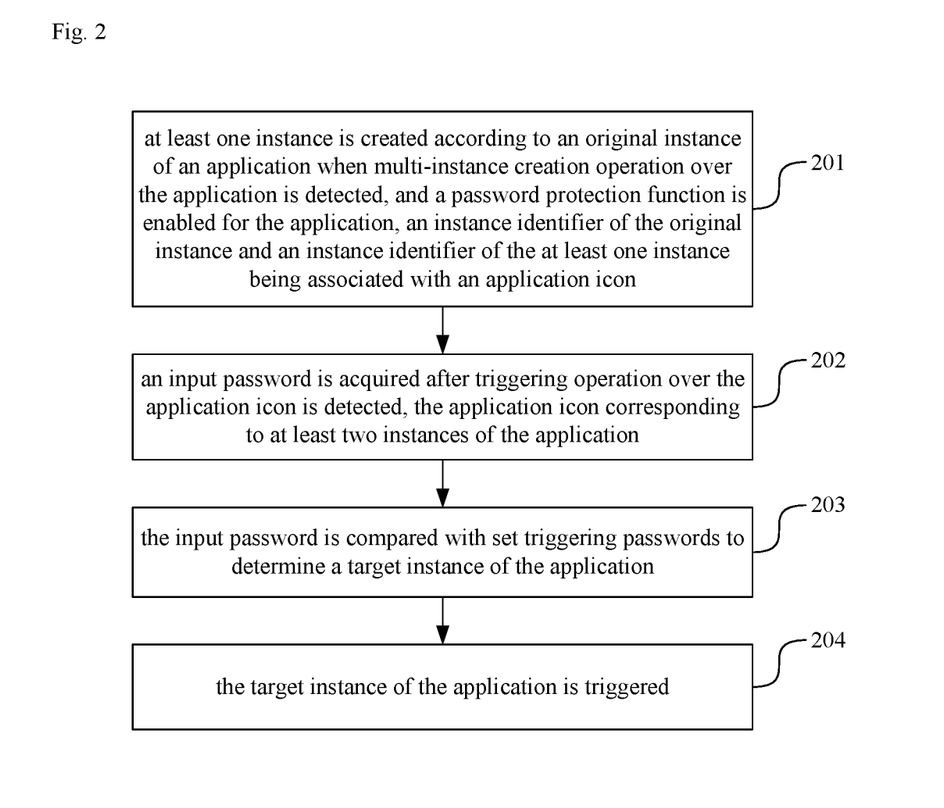
FIG. 2 is a flow chart showing an application triggering method, according to one or more exemplary embodiments.

Now referring to FIG. 2, a flow chart depicting an application triggering method, according to one or more exemplary embodiments. The method is applied to a terminal and includes the following steps. At Step 201, at least one instance is created according to an original instance of an application when a multi-instance creation operation over the application is detected, and a password protection function is enabled for the application. An instance identifier of the original instance and an instance identifier of the at least one instance are associated with an application icon.

In the embodiment of FIG. 2, at least two instances of the application may coexist on the terminal, and the at least two instances include the original instance and the at least one instance created according to the original instance. The original instance refers to a corresponding instance during installation of the application. In a creation process of the at least one instance, the instance identifier that is different from the instance identifier of the original instance, is generated for the at least one instance. That is, different instances of the application has different instance identifiers. The instance identifier of each instance may be the instance name of each instance or a unique identifier allocated to each instance by the terminal or the like, which will not be specifically limited in the embodiment of the present disclosure.

It is noted that the following creation method may be adopted for the at least one instance. First, the at least one instance may be a mirror of the original instance. Function data, corresponding to each instance identifier of the application, is stored so that the function data corresponding to the instance identifier may be directly acquired to utilize functions of the application in a running process of each instance. Second, the at least one instance shares the function data of the application with the original instance. In the running process of the at least one instance, the function data of the application is loaded into respective processes to utilize the functions of the application. Specifically, the terminal configures a storage path for the function data of the application for the at least one instance in the creation process of the at least one instance, so that the function data of the application may be acquired according to the configured storage path and may be loaded into respective processes when the at least one instance runs.

It is noted that multiple instances of the application may correspond to an application icon. This makes it impossible for another user to acquire the number of the instances of the application through the application icon. Multiple instances of the application corresponding to the application icon protect the personal privacy of a user in the creation process of the at least one instance. Specifically, after the instance identifier of the at least one instance is generated, the instance identifier of the original instance and the instance identifier of the at least one instance are associated with the application icon. This provides that multiple instances may be triggered through the application icon. In addition, by means of multiple instances of the application corresponding to the same application icon, an occupied desktop space of the terminal may also be reduced. Meanwhile, the icons may be neatly displayed on the desktop of the terminal.

In order to trigger each instance as required and meet requirements of the user to protect the privacy between different instances, the terminal may provide a password protection function for different instances of the application. Specifically, the terminal enables the password protection function for the application after the at least one instance is created. A process may be as follows: a triggering password set by each account in an at least two account system on the terminal is acquired. The triggering password set by each account is determined as a triggering password for each of the at least two instances. That is, each instance of the application corresponds to the triggering password of one account. Numbers, pictures, characters or other forms may be adopted for the triggering passwords, which will not be specifically limited in the embodiment of the present disclosure.

Specifically, the terminal may associate the at least two instances with the at least two accounts of the terminal one to one, so that the terminal may determine the triggering password for each instance according to the association relationship. For example, the terminal creates a double-on instance according to the original instance of the application, and as such, the application corresponds to two instances. An account system of the terminal includes an account A and an account B. The account A is associated with the original instance, and sets a triggering password "abc" whereas the account B is associated with the double-on instance, and sets a triggering password "123." Then, the triggering password "abc" set by the account A is determined as the triggering password for the original instance and the triggering password "123" set by the account B is determined as the triggering password for the double-on instance.

In another embodiment, the terminal may enable the password protection function as a default, and the original instance of the application may be associated with a default account of the terminal as a default. After the application is installed on the terminal, the terminal determines a triggering password set by the account associated with the original instance as the triggering password for the original instance. After or during creation of the at least one instance of the application, the at least one instance is associated with at least one account except the default account; and triggering password set by each account in the at least one account is determined as the triggering password for each of the associated instances. For example, the terminal associates the original instance with the default account A, and determines its triggering password to be the triggering password "abc" set by the account A. After creating the double-on instance according to the original instance of the application, the terminal associates the double-on instance with the account B, and determines the triggering password "123" set by the account B as the triggering password for the double-on instance.

The following association method may be adopted for the instances and the account system. First, the instance identifiers of the instances are associated with the account system, respectively, and for example, a relationship between an instance identifier and an account identifier is established, or account identifiers are respectively added into the instance identifiers as prefixes of the instance identifiers. Second, different accounts correspond to different storage paths, respectively, and the instances are respectively stored in the storage paths corresponding to the account.

It is noted that the terminal has at least two accounts, each account sets a triggering password. Different accounts may set different triggering passwords. Each account may implement password protection for the application associated with the account by setting the triggering password so that the terminal may start the application or switch the application to a foreground for running after verifying that an input password is consistent with the triggering password upon detection of triggering operation for the application. For example, the application B is associated with the account A, the triggering password set by the account A is "abc," and the terminal enables the password protection function for the application B. When detecting a triggering operation for the application B, the terminal starts the application B or switches the application B to the foreground for running after verifying that the password input by the user is "abc."

The triggering password corresponding to each account may be set by the terminal according to password setting operation of the user for each account. In the at least two account system, a default account may be preset. The default account may be preset by the terminal, or set by the terminal according to selection of the user, or the like, and there are no specific limits made in the embodiment of the present disclosure.

It is noted that the terminal may install an operating system supporting multiple accounts to implement coexistence of multiple accounts on the terminal. Different accounts correspond to different running spaces in the operating system supporting multiple accounts, so that each account may independently run on the basis of its own running space, and each account has an independent triggering password setting function.

It is noted that the at least one instance may have the same functions as the original instance, and may also have a part of the functions of the original instance, so as to meet personalized requirements of the user for multiple instances. In an implementation mode, the at least one instance have the same functions as the original instance. That is, each instance has all functions of the application. In another implementation mode, the at least one instance has a part of the functions of the original instance, and different instances may have different functions of the original instance. During specific implementation, mirrors may be created for a part of function data of the original instance, or only a part of the function data of the original instance is shared to the other instances. For example, for social application A, its original instance has all functions of the social application A. Now, two instances, i.e. instance 2 and instance 3, are created according to the original instance, and the two instances have different functions of the original instance. For example, the instance 2 has a chatting function, and the instance 3 has a function of checking a state of a friend or the like.

When the at least one instance is created, the specific number of the created instances may be determined by the terminal according to a creation number input by the user. The terminal may create multiple instances at one time according to a multi-instance creation operation, and may also create only one instance at one time. Specifically, the process for the terminal to create multiple instances at one time may be implemented as follows. The terminal displays a creation number input interface to the user when detecting multi-instance creation operation for the application. The creation number input by the user in the creation number input interface is acquired, and at least one instance is created according to the acquired creation number. The process for the terminal to create only one instance at one time may be implemented as follows. The terminal creates an instance according to the original instance when detecting the multi-instance creation operation for the application. When detecting the multi-instance creation operation for the application again, the terminal re-executes the step of creating an instance according to the original instance.

Still referring to FIG. 2, at Step 202, an input password is acquired after the triggering operation for the application icon is detected, the application icon corresponding to at least two instances of the application.

In the embodiment, the terminal prompts the user to input a password to subsequently determine an instance to be triggered according to the input password when detecting the triggering operation for the application icon. For example, the terminal displays a password input interface to prompt the user to input the password, and acquires the password input by the user from the password input interface.

The triggering operation for the application icon may be a clicking operation for the application icon or the like, which is not be specifically limited in the present embodiment.

At Step 203, the input password is compared with set triggering passwords to determine a target instance of the application.

The at least two triggering passwords include triggering passwords for different instances of the application and the target instance refers to an instance for which the triggering password is the same as the input password.

Different triggering passwords corresponding to the at least two instances are set respectively, and the set triggering passwords include at least two triggering passwords. After the input password is compared with the at least two set triggering passwords, if there is a triggering password which is the same as the input password in the at least two triggering passwords, it is determined that the instance corresponding to the triggering password the same as the input password is the target instance. If there is no triggering password which is the same as the input password in the at least two triggering passwords, the user is prompted that the input password is wrong.

It is noted that the terminal may simultaneously compare the input password with the at least two triggering passwords during password comparison, and may also compare the input password with the at least two triggering passwords one by one according to a preset sequence. There are no specific limits made to a password comparison manner in the embodiment of the present disclosure.

Still referring to FIG. 2, at Step 204, the target instance of the application is triggered.

The terminal triggers the target instance after determining the target instance of the application. The triggering of the target application proceeds by one of the following two processes. If the target instance of the application is in an off state, the target instance is started. Or, if the target instance of the application is in a background running state, the target instance is switched to the foreground for running.

It is noted that the terminal may start multiple instances of the application at the same time and the user may log in different instances with different user accounts to meet a requirement of simultaneous logging in of the user in the same application with multiple accounts.

It is also noted that Step 203 and Step 204 involve triggering the target instance of the application according to the input password.

It is further noted that the terminal may display an application icon corresponding to each instance. Besides displaying the same application icon corresponding to multiple instances of the application, the following display manners may be adopted so as to improve flexibility of management over the multiple instances.

Manner 1, multiple application icons are displayed according to a separate display operation for the application icon. Specifically, when the separate display operation for the application icon is detected, at least two application icons are generated according to the application icon. The at least two application icons correspond to at least two instances, respectively, and the at least two application icons are displayed.

The separate display operation may be a gesture operation over the application icon. For example, the gesture operation may be multi-finger scaling operation over the application icon. The multi-finger scaling operation may be, for example, operation of backward movement of two fingers centered about the application icon. Alternatively, the gesture operation may be multiple continuous clicking operations over the application icon. The number of multiple continuous clicks and a time interval between any two continuous clicks may be preset by the terminal. Alternatively, the separate display operation may be an operation option of the application icon, and there are no limits made to a specific form of the separate display operation in the embodiment of the present disclosure.

Manner 2, when the password protection function is disabled, multiple application icons are displayed. Specifically, when a disabling operation for the password protection function for the application is detected, at least two application icons are generated according to the application icon. The at least two application icons correspond to the at least two instances, respectively, and the at least two application icons are displayed.

For the above two manners, the at least two application icons may be obtained directly by copying the original application icon, or may be obtained by preset processing after copying the original application icon, such as grey processing or color changing processing. It is contemplated that the preset processing may include any number of methods to visually distinguish the at least two icons. After the at least two application icons are obtained, the at least two application icons are associated with the instance identifiers of the at least two instances one to one, so that the terminal may trigger the correspondingly associated instance when detecting triggering operation over any application icon.

For the above two manners, icon names of the at least two application icons may be different, so that the user may clearly distinguish among the instances according to the displayed application icons. For example, for social application A, there are three instances of the social application A, i.e. the original instance, an instance 2, and an instance 3. An icon name corresponding to the original instance is "social application A", an icon name corresponding to the instance 2 is "social application A2" and an icon name corresponding to the instance 3 is "social application A3." Of course, other manners may also be adopted to distinguish application icons of each application. For example, different icon patterns such as different icon colors may be adopted for distinguishing between each of the displayed application icons.

According to the methods provided by the embodiments of the present disclosure, multiple instances corresponding to an application icon are distinguished by different triggering passwords, so that different instances corresponding to an application icon may be triggered when required by different passwords in a multi-instance scenario, thereby protecting the privacy of a user by adopting different passwords for different instances.

Figure 3A:
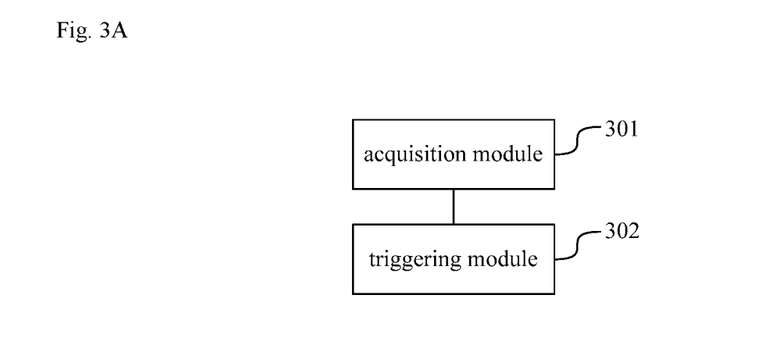
FIG. 3A is a schematic diagram of an application triggering device, according to one or more exemplary embodiments.

Now turning to FIG. 3A, a schematic diagram of an application triggering device according to one or more exemplary embodiments is depicted. The device includes an acquisition module 301 and a triggering module 302. The acquisition module 301 is in communication with the triggering module 302. The acquisition module 301 is configured to acquire an input password after a triggering operation for an application icon is detected, the application icon corresponding to at least two instances of an application. The triggering module 302 is configured to trigger a target instance of the application according to the input password when different triggering passwords are set for the at least two instances, respectively. The target instance refers to an instance for which the triggering password is the same as the input password.

Optionally, the triggering module 302 is configured to compare the input password with the set triggering passwords to determine the target instance of the application and trigger the target instance of the application.

Figure 3B:
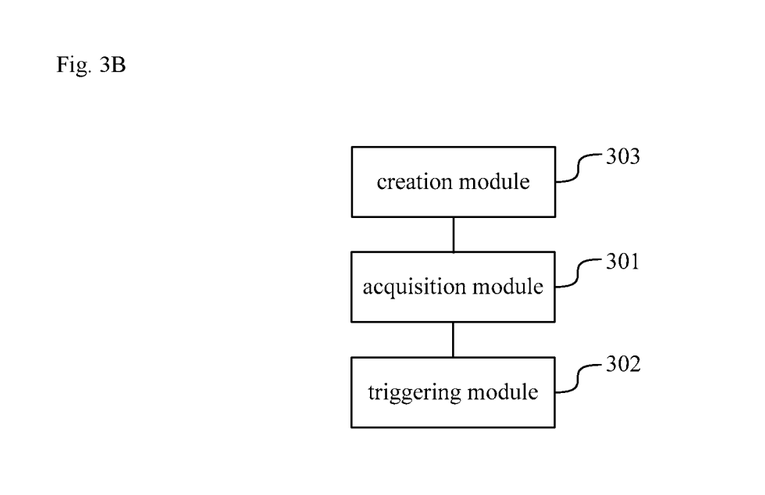
FIG. 3B is a schematic diagram of an application triggering device, according to one or more exemplary embodiments.

Now referring to FIG. 3B, the device may further include a creation module 303, which is configured to create at least one instance according to an original instance of the application when multi-instance creation operation for the application is detected. An instance identifier of the original instance and an instance identifier of the at least one instance are associated with the application icon, and enable a password protection function for the application.

Further, the creation module 303 may be configured to acquire a triggering password set by each account in an at least two account system on a terminal. The creation module 303 may determine the triggering password set by each account as the triggering password for each of the at least two instances.

Figure 3C:
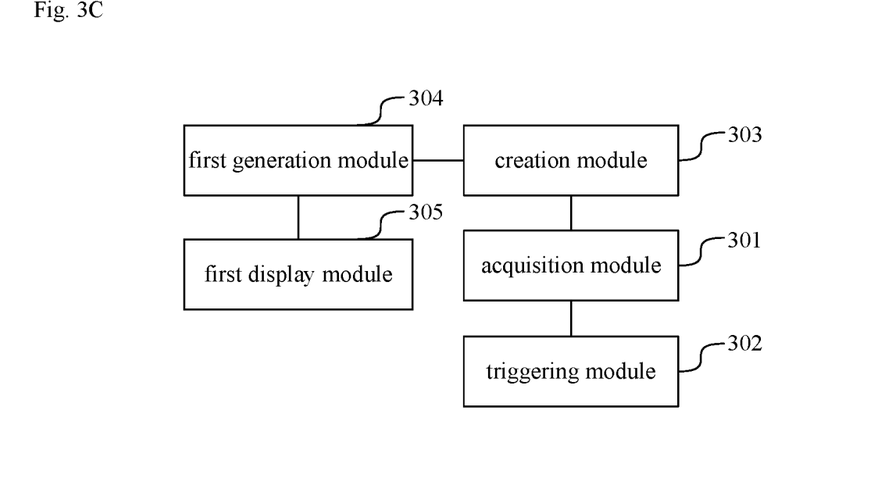
FIG. 3C is a schematic diagram of an application triggering device, according to one or more exemplary embodiments.

Now referring to FIG. 3C, the device may further include a first generation module 304, which is configured to generate at least two application icons according to the original application icon when separate display operation for the application icon is detected. The at least two application icons corresponds to the at least two instances, respectively. A first display module 305 is configured to display the at least two application icons.

Figure 3D:
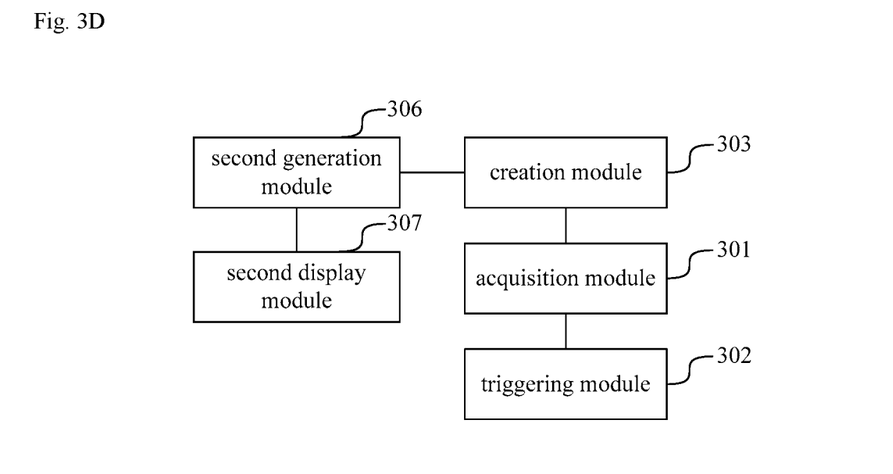
FIG. 3D is a schematic diagram of an application triggering device, according to one or more exemplary embodiments.

Now referring to FIG. 3D, the device may further includes a second generation module 306, which is configured to generate at least two application icons according to the application icon when a disabling operation for the password protection function for the application is detected. The at least two application icons correspond to the at least two instances, respectively. A second display module 307 may be configured to display the at least two application icons.

According to the devices provided by the embodiments presented above, multiple instances corresponding to an application icon are distinguished by different triggering passwords so that different instances corresponding to an application icon may be triggered by different passwords in a multi-instance scenario. By adopting different passwords for different instances the privacy of a user is protected.

With respect to the devices in the above embodiments, the specific manners for performing operations for individual modules therein have been described in detail in the embodiments regarding the methods, which will not be elaborated herein.

Figure 4:
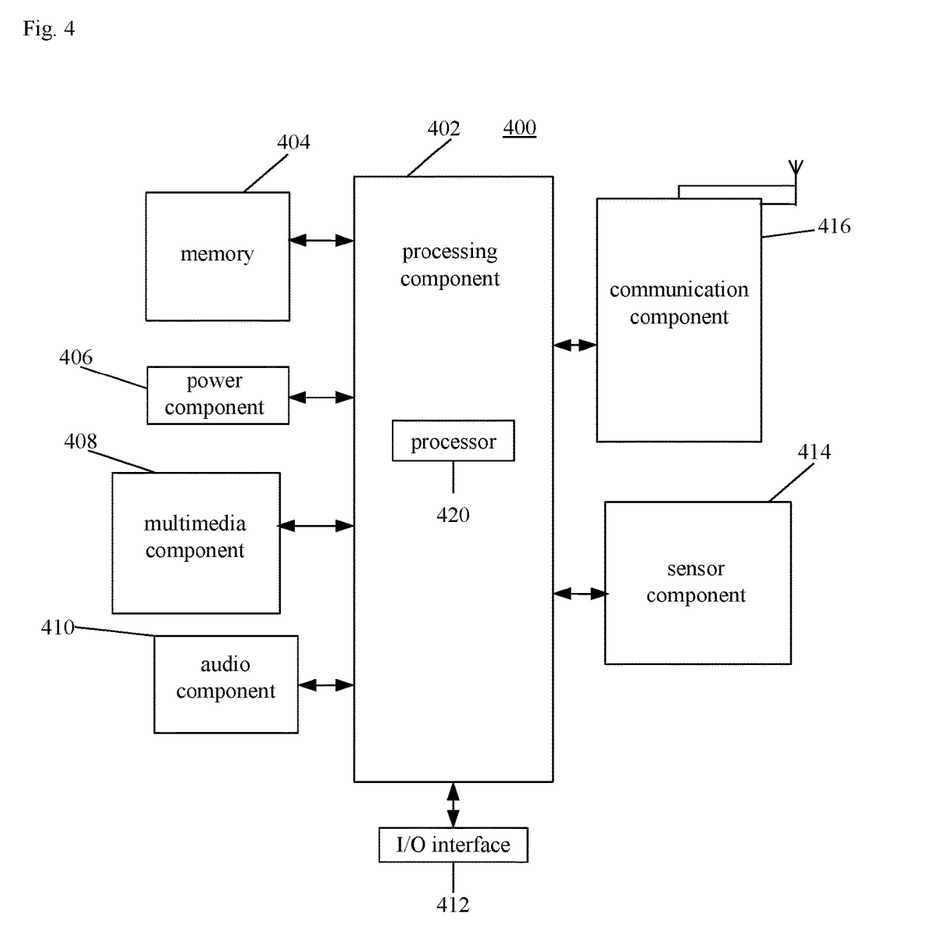
FIG. 4 is a block diagram of an application triggering device, according to one or more exemplary embodiments.

Now turning to FIG. 4, a block diagram of an application triggering device according to one or more exemplary embodiments is depicted. For example, the device 400 may be a mobile phone, a computer, a digital broadcast terminal, a messaging device, a gaming console, a tablet, a medical device, exercise equipment, a Personal Digital Assistant (PDA) or the like.

The device 400 may include one or more of the following components: a processing component 402, a memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, recording operations, or any operations associated with the devices mentioned above. The processing component 402 may include one or more processors 420 to execute instructions to perform all or part of the steps in the abovementioned method. Moreover, the processing component 402 may include one or more modules which facilitate interaction between the processing component 402 and the other components. For example, the processing component 402 may include a multimedia module to facilitate interaction between the multimedia component 408 and the processing component 402.

The memory 404 is configured to store various types of data to support the operation of the device 400. Examples of such data include instructions for any application programs or methods operated on the device 400, contact data, phone-book data, messages, pictures, video, etc. The memory 404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with the generation, management and distribution of power for the device 400.

The multimedia component 408 includes a screen providing an output interface between the device 400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC), and the MIC is configured to receive an external audio signal when the device 400 is in the operation mode, such as a call mode, a recording mode and a voice recognition mode. The received audio signal may be further stored in the memory 404 or sent through the communication component 416. In some embodiments, the audio component 410 further includes a speaker configured to output the audio signal.

The I/O interface 412 provides an interface between the processing component 402 and a peripheral interface module, and the peripheral interface module may be a keyboard, a click wheel, a button and the like. The button may include, but not limited to: a home button, a volume button, a starting button and a locking button.

The sensor component 414 includes one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and another device. The device 400 may access a communication-standard-based wireless network, such as a Wireless Fidelity (WiFi) network, a 2nd-Generation (2G) or 3rd-Generation (3G) network or a combination thereof. In an exemplary embodiment, the communication component 416 receives a broadcast signal or broadcast associated information from an external broadcast management system through a broadcast channel. In an exemplary embodiment, the communication component 416 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 400 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 400 may use the circuitries in combination with the other hardware or software components for performing the above described methods. Each module, sub-module, unit, or sub-unit in the disclosure may be implemented at least partially using the one or more circuitries.

In one or more exemplary embodiments, there is also provided a non-transitory computer-readable storage medium including instructions, such as the memory 404 including instructions and the instructions may be executed by the processor 420 of the device 400 to implement the abovementioned methods. For example, the non-transitory computer-readable storage medium may be a ROM, a Compact Disc Read-Only Memory (CD-ROM), a magnetic tape, a floppy disc, an optical data storage device and the like.

In one or more exemplary embodiments, there is also provided a non-transitory computer-readable storage medium, in which instructions are executed by a processor of a terminal, to cause the terminal to execute the abovementioned application triggering method.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for triggering application, comprising:
setting, by a terminal including a processor and a display, at least two different triggering passwords for at least two instances of an application corresponding to an application icon on a user interface on the display;
acquiring, by the terminal, an input password after a triggering operation over the application icon is detected on the user interface;
triggering, by the terminal, a target instance of the application according to the input password, wherein the target instance refers to an instance for which one of the at least two different triggering passwords is the same as the input password;
creating, by the terminal, at least one instance according to an original instance of the application when a multi-instance creation operation over the application is detected, an instance identifier of the original instance and an instance identifier of the at least one instance being associated with the application icon; and
enabling, by the terminal, a password protection function for the application.

2. The method according to claim 1, wherein triggering the target instance of the application according to the input password comprises:
comparing, by the terminal, the input password with a set of the at least two different triggering passwords to determine the target instance of the application; and
triggering, by the terminal, the target instance of the application.

3. The method according to claim 1, wherein enabling the password protection function for the application comprises:
acquiring a triggering password set by each account system in at least two account systems on a terminal; and
determining the triggering password set by each account system as the triggering password for each of the at least two instances.

4. The method according to claim 1, further comprising:
generating at least two application icons according to the application icon when a separate display operation over the application icon is detected, the at least two application icons corresponding respectively to the at least two instances; and
displaying the at least two application icons.

5. The method according to claim 1, further comprising:
generating at least two application icons according to the application icon when a disabling operation over a password protection function for the application is detected, the at least two application icons corresponding respectively to the at least two instances; and
displaying the at least two application icons.

6. An application triggering device, comprising:
a processor; and
a memory configured to store instructions executable by the processor,
wherein the processor is configured to:
set at least two different triggering passwords for at least two instances of an application corresponding to an application icon on a user interface on a display;
acquire an input password after a triggering operation over the application icon is detected on the user interface;

trigger a target instance of the application according to the input password, wherein the target instance refers to an instance for which one of the at least two different triggering passwords is the same as the input password;

create at least one instance according to an original instance of the application when a multi-instance creation operation over the application is detected, an instance identifier of the original instance and an instance identifier of the at least one instance being associated with the application icon; and enable a password protection function for the application.

7. The application triggering device according to claim 6, wherein the processor is further configured to:

compare the input password with a set of the at least two different triggering passwords to determine the target instance of the application; and trigger the target instance of the application.

8. The application triggering device according to claim 6, wherein the processor is further configured to:

acquire a triggering password set by each account system in at least two account systems on a terminal; and determine the triggering password set by each account system as the triggering password for each of the at least two instances.

9. The application triggering device according to claim 6, wherein the processor is further configured to:

generate at least two application icons according to the application icon when a separate display operation over the application icon is detected, the at least two application icons corresponding to the at least two instances, respectively; and display the at least two application icons.

10. The application triggering device according to claim 6, wherein the processor is further configured to:

generate at least two application icons according to the application icon when a disabling operation over a password protection function for the application is detected, the at least two application icons corresponding to the at least two instances, respectively; and display the at least two application icons.

11. A non-transitory computer-readable storage medium having stored therein instructions that, when executed by a processor of a terminal, causes the terminal to perform an application triggering method, the method comprising:

setting at least two different triggering passwords for at least two instances of an application corresponding to an application icon on a user interface on a display;

acquiring an input password after a triggering operation over the application icon is detected on the user interface;

triggering a target instance of the application according to the input password, wherein the target instance refers to an instance for which one of the at least two different triggering passwords is the same as the input password;

before the triggering operation over the application icon is detected, the method further comprising:

creating at least one instance according to an original instance of the application when a multi-instance creation operation over the application is detected, an instance identifier of the original instance and an instance identifier of the at least one instance being associated with the application icon; and enabling a password protection function for the application.

12. The non-transitory computer-readable storage medium according to claim 11, wherein triggering the target instance of the application according to the input password comprises:

comparing the input password with a set of the at least two different triggering passwords to determine the target instance of the application; and triggering the target instance of the application.

13. The non-transitory computer-readable storage medium according to claim 11, wherein enabling the password protection function for the application comprises:

acquiring triggering password set by each account system in at least two account systems on a terminal; and determining the triggering password set by each account system as the triggering password for each of the at least two instances.

14. The non-transitory computer-readable storage medium according to claim 11, further comprising:

generating at least two application icons according to the application icon when a separate display operation over the application icon is detected, the at least two application icons corresponding to the at least two instances, respectively; and displaying the at least two application icons.

15. The non-transitory computer-readable storage medium according to claim 11, further comprising:

generating at least two application icons according to the application icon when a disabling operation over a password protection function for the application is detected, the at least two application icons corresponding to the at least two instances respectively; and displaying the at least two application icons.

* * * * *